July 11, 1939. H. S. PEYTON 2,165,411
METHOD OF MAKING HELICAL SPRINGS
Filed Aug. 9, 1938
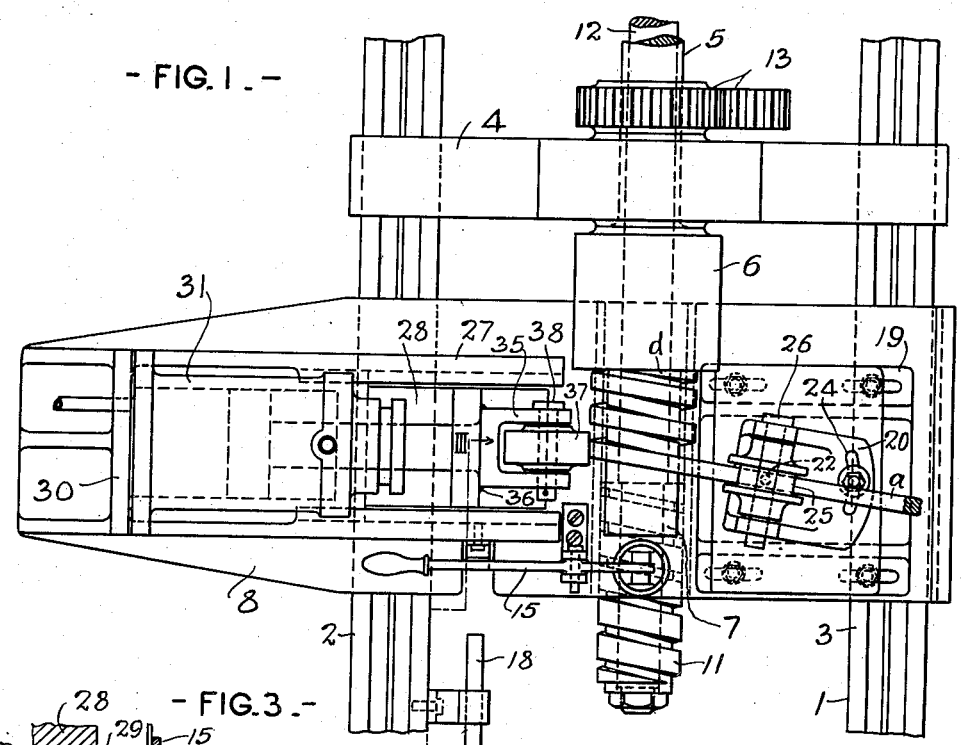
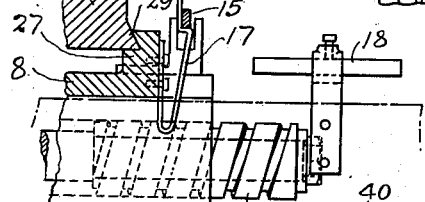
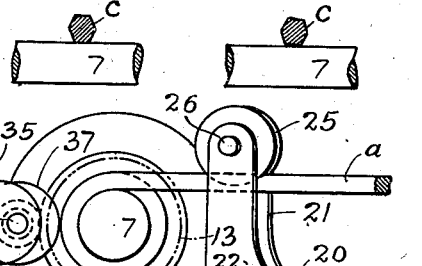
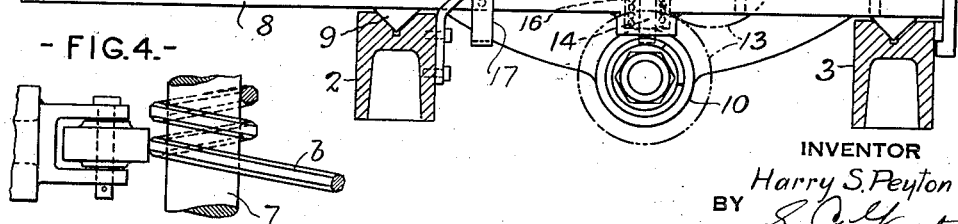
INVENTOR
Harry S. Peyton
BY
ATTORNEY Patented July 11, 1939

2,165,411

UNITED STATES PATENT OFFICE 2,165,411

METHOD OF MAKING HELICAL SPRINGS

Harry S. Peyton, Chicago Heights, Ill., assignor to American Locomotive Company, New York, N. Y., a corporation of New York Application August 9, 1938, Serial No. 223,791

1 Claim. (Cl. 153—67)

This invention relates to a method of making helical springs by coiling around a mandrel a spring bar having a depth not less than the width of the face of the bar in engagement with the mandrel.

The principal object of the invention is the devising of a method of making helical springs from such a bar that have improved structural features and are more uniform than those constructed according to usual practice.

Helical springs are made from bar stock which is coiled upon a revolving mandrel, the bar, being preheated when deemed necessary, to a suitable temperature to facilitate forming it into the helix upon the mandrel.

In the formation of a bar into a helix, the bar is deformed and, due thereto, according to usual practice, when the bar is of the aforementioned characteristic, the cross section of the helix assumes a more or less tilted position relative to the mandrel. This produces inferior springs and springs that are not of uniform characteristics. The present method is directed to prevent such tilting upon the mandrel.

There are numerous machines for manufacturing helical springs, any of which, when suitably modified, may be employed in carrying out the method of the present invention. The machine shown in the drawing is admirably adapted to carry out the invention, and is similar to the machine shown in one of the embodiments of my copending application Serial No. 222,877, filed August 3, 1938, covering Method and machines for making springs, of which the present application is a continuation in part. Therefore but a brief description will be made of the machine, and for a fuller understanding reference may be had to said copending application.

Referring to the drawing forming part of this application, Figure 1 is a plan view of a part of a machine suitable for the practice of the method of the present invention, showing a bar of square cross section; Fig. 2 is an end view of the machine of Fig. 1, shown partly in section; Fig. 3 is a fragmental front elevation of a part of the machine of Fig. 1, partly in section and partly in dot and dash lines, showing a latch and releasing mechanism; Fig. 4 is a fragmental plan view of a portion of the machine of Fig. 1, showing a bar of octagonal cross section; Fig. 5 is a side elevation of a portion of a mandrel and a cross section of a helix as usually formed, illustrating the objectionable tilting; and Fig. 6 is a view, similar to Fig. 5, showing a cross section of a helix made according to the present invention in which there is no tilting.

The machine comprises a frame 1 having longitudinal front and rear members 2 and 3 respectively, and a cross member 4. A drive shaft 5 is journalled in the member 4 and a chuck 6 is secured to the inner end of this shaft. A mandrel 7 is firmly secured at an end portion thereof in the chuck 6, and the chuck 6 may be of any usual or preferred construction so that the mandrel may be removed therefrom and mandrels of different sizes employed suitable for the size of the spring that is to be manufactured.

A carriage 8 is mounted to slide upon the members 2 and 3 and is connected thereto by a tongue and groove connection 9. The carriage is provided with a depending hub 10 through which extends a screw 11 secured upon a shaft 12 which is journalled in the cross member 4. The shafts 5 and 12 are connected by the train of gears 13, so that one shaft will drive the other, the driving shaft, preferably shaft 5, being driven from any desired source (not shown). The pitch of the screw 11 determines the pitch of the spring, and the screw is detachable from the shaft 12 so that screws of different pitch may be used.

A pin 14, carried by the carriage 8, fits within the groove between the threads of the screw 11 to provide a drive for the carriage so that as the screw rotates the carriage moves longitudinally in a direction away from the chuck 6. The pin is held in carriage-driving position by means of a lever 15 and when the lever is released a spring 16 raises the pin out of the groove of the screw. The lever 15 is held in its position corresponding to pin-driving position by a spring latch 17. The latch is released by an adjustable rod 18 secured to the frame member 2. This releases the lever 15 permitting the spring 16 to act to disengage the pin from the groove of the screw to stop the carriage 8. By proper adjustment of the rod 18 this occurs when the carriage has been moved a sufficient distance to complete the formation of the spring, as will later appear. When the carriage has reached this position the rod 18 engages and releases the latch 17 from the lever 15.

A bracket 19 is secured upon the carriage for adjustment to and from the mandrel, and a second bracket 20 having branches 21, is mounted upon the bracket 19 by a pivot bolt 22 and by a bolt 23 fitting within a slot 24 of the bracket 20. The bracket 20 is thus adapted for angular adjustment relative to the axis of the mandrel 7. A flanged roller 25 is rotatably mounted between the branches 21 upon a pin 26 detachably secured in the branches. The roller 25 is for guiding the rod to the mandrel, the rod being disposed beneath the roller between the flanges thereof. The space across the flanges will be appropriate for the size of the rod, and the roller is made detachable so that rollers may be selected having the proper space between the flanges for the size of bar used in each instance. The bracket 20 will be adjusted in each instance to give the roller 25 the proper angle which will depend upon the pitch of the spring.

In Figs. 1 and 2 a bar $a$ is shown of square cross section.

Fig. 4 shows a portion of a spring made from a bar $b$ of octagonal cross section.

Figs. 5 and 6 show the bar $c$ from which the spring is made of hexagonal cross section. These cross sections are merely illustrative of the many that may be used when practicing the present method.

The bar $a$, at its forward end $d$, is formed wedge-shape as shown. The bar is fragmentally shown but it will be understood that the rear end is correspondingly shaped in the usual manner. The forward end $d$ is secured to the mandrel in the usual manner by any suitable means (not shown), a suitable means being shown in the patent to Williams, 1,827,056.

Coming now to the feature of the apparatus especially adapted for the practice of the present method, the carriage 8 is provided with guides 27 between which is disposed a bracket 28 slidably connected with the guides by dovetail connections 29. The carriage is provided, at its forward end, with a vertical bracket 30 upon which is secured a horizontal cylinder 31, the bracket 30 forming the front head of the cylinder. The rear head is provided with a stuffing box 32 through which passes a piston rod 33 connected to a piston 34 disposed in the cylinder 31. The opposite end of the piston rod 33 passes through bracket 28 and is forked at its rear end providing branches 35. The piston rod is secured to the bracket 28 by welds 36 so that as the piston moves within the cylinder the bracket moves simultaneously therewith. A roller 37 is mounted between the branches 35 upon a pin 38.

Any suitable control means may be employed for supplying the opposite ends of the cylinder with compressed air or other fluid, and for exhausting it therefrom. In the present instance a pipe 39 is connected to the front end of the cylinder and may be used for supplying compressed air to and exhausting it from this end of the cylinder. A pipe 40 is connected to the rear end of the cylinder and may be used for supplying compressed air to and exhausting it from this end of the cylinder.

In the forming of a helical spring the carriage 8 will be moved to its initial position with the roller 37 against the forward end portion of the spring preparatory to forming the first coil of the helix. The rear end of the cylinder is open to exhaust and the front end of the cylinder is open to admission so that the front end is filled with the fluid under the required pressure. This forces the roller 37 against the forward end of the spring. As the mandrel revolves, the carriage, with its rollers 25 and 37, is moved by the screw 11 at a speed, depending upon the pitch of the screw 11, relative to the speed of the mandrel to form a helical spring of the desired pitch. The roller 25 holds the rod at the proper angle relative to the axis of the mandrel for this particular pitch of spring, and the roller 37 always maintains contact with the outer face of the bar as it is being formed into the helix. The roller 37 preferably engages but one coil of the spring at a time so that its force pressing that coil toward the mandrel will not be affected by any other coil.

In a properly constructed helical spring the intention is that the inner face of the bar should snugly engage the mandrel across the entire width of the bar so intended to engage. In actual practice however this is not attained. But contrariwise the bar tilts about one of the edges of this face, the face assuming an angle to the mandrel. This is shown in Fig. 5. This tilting increases as the width of this mandrel-engaging face decreases and the depth of the bar increases. This problem is not present in the case of a bar having a face in engagement with the mandrel wider than the depth of the bar, to the extent that provision must be made to overcome the tilting. Obviously in the case of a spring bar of circular cross section, tilting would not be present. The invention therefore applies only to a spring bar in which the base is of insufficient width to support the spring bar and prevent it from tilting due to the deforming of the metal during the coiling operation.

It is the purpose of this invention to resist this tilting by the application of sufficient force to substantially prevent it in the finished spring. It will be obvious that this force may be applied at any point on the outer face of the bar as it is being coiled, that would spread from the mandrel, as a result of the tilting, providing the force is of sufficient magnitude, the least force being necessary at the point where the spreading away from the mandrel is greatest.

However in the preferred practice of the invention the pressure is imparted by a rigid member, such as the roller 37, which engages the outer surface of the bar opposite the inner face, the pressure upon the roller being of sufficient magnitude to force the inner face of the bar firmly and evenly throughout upon the mandrel. This is shown in Fig. 6. The pressure is preferably a yielding pressure in order that it will compensate for bar irregularities. While the roller 37 is shown as following the formation of the helix by substantially one-quarter turn thereof it will be understood that this is only for illustrative purposes and it may follow, if desired, at other distances.

A spring made in accordance with the present invention maintains uniform inside and outside diameters and insures a uniform height of spring for a given amount of maximum compression. That is to say a spring made by the present method attains these desirable features to a higher degree than a spring made according to usual practice. A spring made according to the present invention is more dependable as to the attainment of the desired dimensions and therefore springs of greater uniformity can be made. A helical spring of general, cylindrical shape and of accurate and uniform inside diameter is often highly desirable where it is to be used as a snug fit upon a cylindrical bolt, and similarly a cylindrical helical spring of accurate and uniform outside diameter is often highly desirable where it is to snugly fit within a hollow cylinder.

The invention claimed and desired to be secured by Letters Patent is:

The method of making helical compression springs having a plurality of spaced convolutions of polygonal cross section, each convolution having its inner face of a width no greater than the depth of the convolution in a radial direction thereof, which consists in securing, to a rotatable mandrel, an end of a bar for making such a spring, said bar being of a cross section similar to said convolution cross section; gradually feeding said bar to said rotating mandrel with the face of the fed portion of said bar, providing the inner face of the spring to be formed, engaging said mandrel; simultaneously with said feeding of said bar, moving the unfed portion thereof in a direction axially of said mandrel away from said secured end and at a speed relative to the speed of said rotation whereby said spaced convolutions are produced on said mandrel; and simultaneously with said axial movement of said bar, applying a yielding pressure from a rigid member upon each convolution individually, progressively as it is being formed upon said mandrel, said pressure forcing said convolution, as it is being formed, against said mandrel, said pressure being of sufficient magnitude to force said convolution in complete contact with said mandrel at its engaging face therewith and with said rigid member at its engaging face therewith, thereby preventing tilting of said convolutions upon said mandrel.

HARRY S. PEYTON.